(No Model.)

J. C. DAGGETT.
CHANNEL FLAP LAYING MACHINE.

No. 393,097. Patented Nov. 20, 1888.

Witnesses.
Howard F. Eaton.
John F. C. Preinkirk.

Inventor.
John C. Daggett.
By Crosby & Gregory
Attys.

UNITED STATES PATENT OFFICE.

JOHN C. DAGGETT, OF BOSTON, ASSIGNOR OF ONE-HALF TO CHARLES H. COLBURN, OF MILFORD, MASSACHUSETTS.

CHANNEL-FLAP-LAYING MACHINE.

SPECIFICATION forming part of Letters Patent No. 393,097, dated November 20, 1888.

Application filed November 8, 1887. Serial No. 254,631. (No model.)

*To all whom it may concern:*

Be it known that I, JOHN C. DAGGETT, of Boston, county of Suffolk, State of Massachusetts, have invented an Improvement in Channel-Flap-Laying Machines, of which the following description, in connection with the accompanying drawings, is a specification, like letters on the drawings representing like parts.

This invention has for its object to provide an improved tool for laying the channel-lip of soles to cover the fastenings employed therein, my improved tool being also applicable for other work wherein leather is to be acted upon to be smoothed or rubbed.

My invention consists in a tool composed, essentially, of a series of arms or strikers having blunt or rounded edges and separated by an elastic medium, preferably rubber or its equivalent in the form of blocks, the arms or strikers and the india-rubber being held by a strong body, preferably made of metal, the arms or strikers having shoulders which overlap the rubber blocks and aid in holding them in place, substantially as will be described, the tool being adapted to be attached to a rotating shaft.

Figure 1:
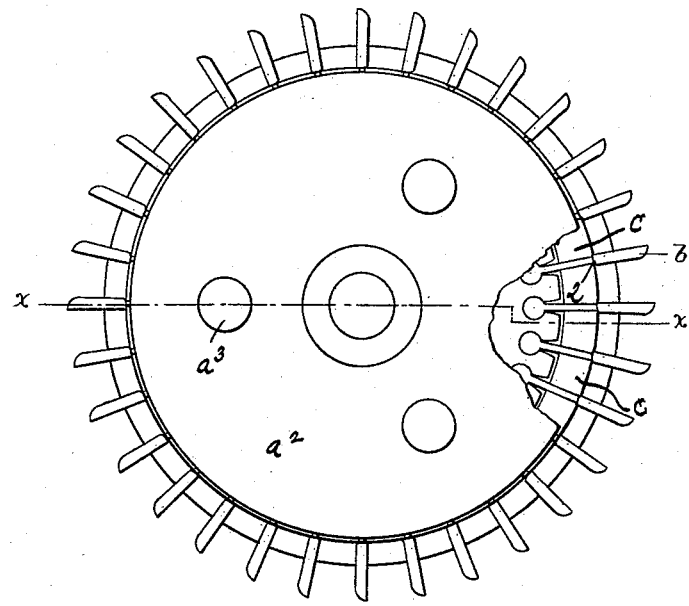
Figure 2:
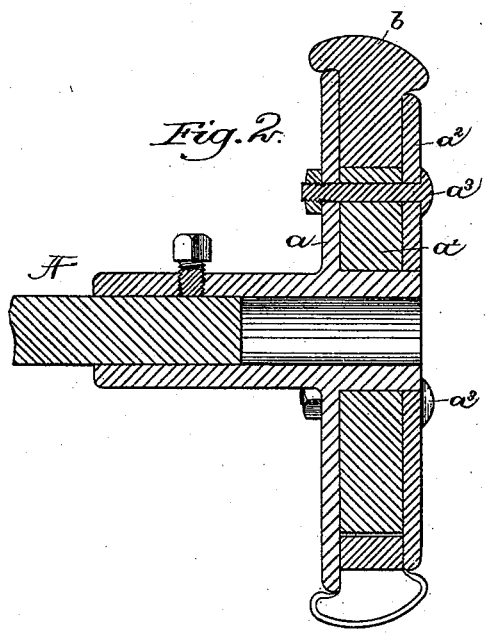

Figure 1, in front elevation, partially broken out, represents a tool embodying my invention; and Fig. 2, a section thereof in the irregular dotted line $x \, x$.

The body of my improved tool, as herein shown, is composed of a hub, $a$, a seat, $a'$, and a clamping plate or ring, $a^2$, the said parts being held together by suitable screws or bolts, as $a^3$. The seat $a'$ is herein shown as notched at its periphery (see Fig. 1) for the reception of the inner ends of the arms or strikers $b$, the inner ends of which are preferably made nearly circular to enter the said notches, which form seats for the said arms or strikers and permit them to rock or move to a limited extent therein when the tool attached to a rotating shaft, as A, is doing work, the said arms or strikers, rounded or beveled at their enlarged outer ends, substantially as shown in the drawings, being separated by an elastic medium, $c$, composed preferably of india-rubber in the form of blocks.

As shown in Fig. 1, the arms or strikers have at their sides projections, as 2, which, when the arms are in place, overlap somewhat the rubber blocks $c$, thus better holding the latter in place. Were it not for these shoulders, the rubber blocks would work out of position between adjacent arms or strikers.

The elastic medium $c$ enables the arms or strikers to strike a cushioned blow, which, when the tool is being used to lay down over the fastenings the lip of a channel cut into a sole, will not tear or break the said lip, which in some classes of shoes is quite wide and thin.

The tool described may be used to advantage in smoothing seams in leather-work.

I do not desire to limit my invention to the exact shape of the body, as it is obvious that the same might be somewhat altered without departing from my invention.

I claim—

The herein-described tool, consisting, essentially, of the flanged hub, clamping-plate, and notched seat intermediate thereof, all held together by bolts parallel to the rotating shaft to which the tool is adapted to be attached, the independent arms or blades $b$, having cushion-retaining shoulders, and the interposed yielding or rubber cushions around the periphery of the notched seat and overlapped by the said shoulders and retained in place thereby, substantially as described.

In testimony whereof I have signed my name to this specification in the presence of two subscribing witnesses.

JOHN C. DAGGETT.

Witnesses:
N. B. JOHNSON,
C. T. DAY.